United States Patent [19]

Little

[11] 3,940,146

[45] Feb. 24, 1976

[54] GOLF BALL COVER

[75] Inventor: James F. Little, Greenville, R.I.

[73] Assignee: Uniroyal Inc., New York, N.Y.

[22] Filed: Aug. 21, 1972

[21] Appl. No.: 282,625

Related U.S. Application Data

[63] Continuation-in-part of Ser. No. 112,488, Feb. 3, 1971, abandoned.

[52] U.S. Cl.. 273/235 R; 273/DIG. 4; 273/DIG. 22; 260/42.29; 260/42.41; 260/42.43; 260/42.46; 260/998.14
[51] Int. Cl.² .................... A63B 37/12; C08L 23/34
[58] Field of Search......... 273/218, 235; 260/897 C, 260/998.14, 42.43, 42.46

[56] References Cited
UNITED STATES PATENTS 2,212,786   8/1940   McQueen...................... 260/79.3 R
3,264,272   8/1966   Rees ................................ 273/218
3,454,280   7/1969   Harrison et al..................... 273/235
3,454,676   7/1969   Busse................................ 273/218
3,572,721   3/1971   Harrison et al..................... 273/218

OTHER PUBLICATIONS

"The Vanderbilt Rubber Handbook", R. T. Vanderbilt Co., Inc., N.Y., 1968, pp. 189 & 190.

*Primary Examiner*—Allan Lieberman
*Attorney, Agent, or Firm*—Willard R. Sprowls

[57] ABSTRACT

This invention relates to an improved golf ball cover comprised of an ionomer based upon the copolymers of, e.g., ethylene and acrylic or methacrylic acid and a chlorosulfonated polyethylene. Covers made in accordance with this invention exhibit high durability features.

4 Claims, No Drawings

GOLF BALL COVER

This application is a continuation-in-part of my application Ser. No. 112,488, filed Feb. 3, 1971 and now abandoned.

This invention relates to a new golf ball cover which may be utilized to encompass either a conventional wound golf ball core or the more recently developed solid unitary core. Both cores may be enclosed in this new cover to produce a golf ball which is highly resistant to damage upon impact of a golf club, yet does not sacrifice the all important characteristics of a high quality golf ball.

It is the main aspect of this invention to produce a golf ball cover which displays improved durability over those covers now in use, while cost factors and processing technique remain realistic.

Golf ball covers have in the past been produced using a variety of materials. As main ingredients, natural transpolyisoprene (natural balata or gutta percha), synthetic transpolyisoprene, thermoplastic resins such as polyethylene or polypropylene and ionomer resins have been included in these formulations. The covers produced with these materials, however, display certain undesirable properties, among which are poor durability, low cut resistance, poor "click" and "feel". Many of these materials are also quite costly and not readily adaptable to golf ball covers.

The novel cover stock which I have discovered possesses all the features desired; a few of which are: (a) thermoplastic with a relatively low molding temperature, (b) no curing or vulcanization requirement, (c) low cost, (d) high durability, and (e) imparts good "click" and "feel" to a golf ball.

I have found that a composition made up primarily of an ionomer resin containing from about 5 to about 20 parts by weight, per 100 parts by weight of an ionomer resin, of a chlorosulfonated polyethylene can be molded into a golf ball cover which will possess all these desired qualities.

The use of the ionomer resin alone in a golf ball cover stock has been described in U.S. Pat. No. 3,454,280, issued July 8, 1969. However, covers produced in accordance with this patent have a tendency to split at the molding seams when struck by a golf club. Due to the inherent hardness of the ionomer, these covers also impart a hard or "stony feel" to the ball in play. The addition of the chlorosulfonated polyethylene to the ionomer cover stock greatly improves seam adhesion and the "feel" of the ball in play. The Shore C hardness of my cover composition is lower than the cover stock containing only the ionomer, and this factor contributes to the improved "feel" of the ball.

The ionomer component of my cover is a wellknown material, being described in detail in U.S. Pat. No. 3,264,272, issued Aug. 2, 1966, the disclosure of this patent being hereby incorporated herein by reference. The term "ionomer" has been introduced in the art to designate an ionic copolymer of at least 50 mole percent (based on the alphaolefin-acid copolymer) of one or more alphaolefins, including ethylene and alphaolefins having up to 10 carbon atoms, together with a lesser proportion of an alpha, beta ethylenically unsaturated monocarboxylic acid or dicarboxylic acid having from 3 to 8 carbon atoms, the acid monomer content of said copolymer being from 0.2 to 25 mole-percent, based on the alphaolefin-acid copolymer, said copolymer containing uniformly distributed throughout the copolymer a metal ion having an ionized valence of 1 to 3 inclusive in monocarboxylic acid containing ionomers and a valence of 1 in dicarboxylic acid-containing ionomers. At least 10 percent to 90 percent of the carboxylic acid groups of the copolymer are neutralized by the metal ions and exist in the ionic state. Any other monomer component optionally copolymerized in said copolymer is monoethylenically unsaturated. Ionomers based on copolymers of ethylene and acrylic or methacrylic acid are most common. The metal ions are commonly ions of metals of Groups I, II, III, IV-A and VIII of the Periodic Table, the more common ones being ions of the alkali metals such as sodium and potassium, and the alkaline earth metals such as calcium, strontium, barium and such commonly available metals as zinc and aluminum. The ionomers are hard, transparent, resinous thermoplastic materials.

The preferred ionomers used in the practice of my invention are those known in the trade as "Surlyn A", these being ionic copolymers of approximately 96.5 mole-percent of ethylene and 3.5 mole-percent of methacrylic acid, sodium or zinc ions being uniformly distributed throughout the copolymer to an extent representing about 50% neutralization of the methacrylic acid.

The chlorosulfonated polyethylene component of my cover stock is a material described in U.S. Pat. No. 2,212,786, issued Aug. 27, 1940, said disclosure being incorporated herein by reference. These materials are produced by reacting a solid ethylene polymer of at least 1000 molecular weight, with chlorine and sulfur dioxide. The resultant products used in my cover composition are those known in the trade as "Hypalon". Hypalon is marketed in five types, 20, 30, 40, 45, and 48, each of which contains varying percentages of chlorine and sulfur. Hypalon 20 contains 29% chlorine and 1.4% sulfur and gives optimum results when combined with the ionomer in my composition. It has been found that suitable limits for the chlorine and sulfur content of the chlorosulfonated polyethylene are 25–35% chlorine and 1.0–1.4% sulfur.

Fillers can be used in the golf ball covers of this invention, but are not an essential ingredient. The functions of the fillers are to make the cover white and to make any desired adjustments in the specific gravity of the stock. Suitable fillers include titanium dioxide, whiting, lead carbonate and silica.

Conventional golf ball cover materials, especially those based on balata, can be molded onto wound cores (or centers as they are sometimes referred to) at temperatures ranging from about 200° to about 250° F. Ionomers of the type employed in my invention generally must be molded at higher temperatures, typically in the range from 250° to 350° F. The inclusion of chlorosulfonated polyethylene in the cover stock lowers the processing temperature, so that the molding operation can be conducted in the lower portion of the latter range. Blanks or preforms of the cover material are prepared and preheated immediately prior to molding. Each blank should be large enough to make one half the finished cover, while including sufficient material to allow some flash to insure good molding. One blank is placed in each of the two preheated mold halves prior to insertion of the core (or center) into the lower half. The mold is then closed gradually to prevent bursting of the core. As soon as mold closure is completed, the mold and its contents are cooled. The finished ball is then removed from the press for buffing, painting, branding and packaging. Exact details of the molding cycle will vary slightly, depending on many factors; e.g. type of ball (wound or solid), cover composition, molding press, rate of heating and rate of cooling. The details of time, rate of closure, etc. will be readily determined by one skilled in the art of making golf balls. However, a typical cycle for the conventional equipment employed in the industry using a press with the mold halves placed vertically over one another runs as follows:

1. Preheat press to 300° F.
2. Preheat cover blank to 250–300° F.
3. Insert heated blanks into both halves of each mold.
4. Place core in lower mold half.
5. Close mold slowly to allow excess cover stock to flow out around the core without bursting the core (about 10 seconds required after first contact of the contents of the two mold halves.)
6. Hold press closed and maintain temperature for 10 seconds to insure good knitting of the two cover halves.
7. Cool the mold (10 to 30 minutes may be required depending on mold construction and temperature of the cooling medium).
8. Open press and remove ball for subsequent processing.

To illustrate my invention the following examples, in which all parts are by weight, are presented. It should be understood, however, that these examples are merely illustrative and are not to be regarded as limitations to the appended claims since the basic teachings thereof may be varied at will, as will be understood by one skilled in the art.

EXAMPLE 1

The following materials (parts by weight) were blended together on a conventional rubber mill:

|  | A | B |
|---|---|---|
| Surlyn A 1559* | 100 | 100 |
| Titanium dioxide | 10 | 10 |
| Hypalon 20 | — | 10 |
| *Characteristics of Surlyn A 1559 include: | | |
| Major cation | Sodium | |
| Density (ASTM D792-60T) | 0.940 gms/cc | |
| Melt flow index (ASTM D1238-62T) | 1.2 decigrams/min. | |
| Softening point - Vicat (ASTM D1525-58T) | 160°F. | |
| Tensile strength (ASTM D412-62T) | 4000 p.s.i. | |
| Yield strength (ASTM D412-62T) | 1900 p.s.i. | |
| Elongation (ASTM D412-62T) | 450% | |

These mixes were formed into blanks and molded onto conventional rubber thread wound cores. Balls were hit in a durability tester with the following results. (The durability tester is a machine which hits the ball with a hard consistent blow, repeating the blow until the ball fails due to rupture, distortion, cover loosening or some other change which destroys the function as a golf ball.)

|  | A | B |
|---|---|---|
| ** Durability half life | 75 | 85 |
| Shore C Hardness | 93 | 90 |
| Seam failure at 75 hits in sample of 12 balls | 5 | 1 |

**Half life is the number of hits in the durability test machine to cause half the balls in a given sample to fail.

EXAMPLE 2

|  | C | D |
|---|---|---|
| Surlyn A 1559 | 100 | 90 |
| Titanium Dioxide | 5 | 5 |
| Hypalon 20 | — | 10 |

After mixing as in Example 1 and used to cover golf balls, I obtained the following:

|  | C | D |
|---|---|---|
| Durability half life | 100 | 115 |

What is claimed is:

1. In a golf ball made up of a core and a thermoplastic cover said cover containing: (a) an ionic copolymer of (1) at least 50 mole percent (based on the alphaolefin-acid copolymer) of one or more olefins selected from the group consisting of ethylene and alphaolefins having up to 10 carbon atoms and of (2) from 0.2 to 25 mole percent (based on the alphaolefin-acid copolymer) of an alpha, beta ethylenically unsaturated mono- or dicarboxylic acid having from 3 to 8 carbon atoms, said copolymer containing in substantially uniform distribution a metal ion having a valence of 1 to 3 in monocarboxylic acid containing copolymers and a valence of 1 in dicarboxylic acid-containing copolymers; and (b) from about 5 to about 10 parts by weight of a filler per 100 parts by weight of said ionic copolymer, the improvement comprising the addition to the cover composition of from about 5 to about 20 parts by weight, per 100 parts by weight of said ionic copolymer, of a chlorosulfonated polyethylene containing from 25 to 35 percent chlorine and from 0.1 to 1.4 percent sulfur.

2. The golf ball cover of claim 1, wherein the chlorosulfonated polyethylene contains 29% chlorine and 1.4% sulfur.

3. The golf ball cover of claim 1, wherein the amount of chlorosulfonated polyethylene is about 10 parts by weight per 100 parts by weight of said ionic copolymer.

4. In a golf ball made up of a core and a thermoplastic cover said cover containing: (a) an ionic copolymer of (1) at least 50 mole percent (based on the alphaolefin-acid copolymer) of one or more olefins selected from the group consisting of ethylene and alphaolefins having up to 10 carbon atoms and of (2) from 0.2 to 25 mole percent (based on the alphaolefin-acid copolymer) of an alpha, beta ethylenically unsaturated mono- or dicarboxylic acid having from 3 to 8 carbon atoms, said copolymer containing in substantially uniform distribution a metal ion having a valence of 1 to 3 in monocarboxylic acid containing copolymers and a valence of 1 in dicarboxylic acid-containing copolymers; and (b) an amount of filler sufficient to impart high durability and good "click" and "feel" to said golf ball, the improvement comprising the addition to the cover composition of from about 5 to about 20 parts by weight, per 100 parts by weight of said ionic copolymer, of a chlorosulfonated polyethylene containing from 25 to 35 percent chlorine and from 0.1 to 1.4 percent sulfur.

* * * * *